March 16, 1971     H. HAVERKAMP ET AL     3,570,226
ELECTRICALLY DRIVEN LAWNMOWER
Filed Aug. 5, 1968
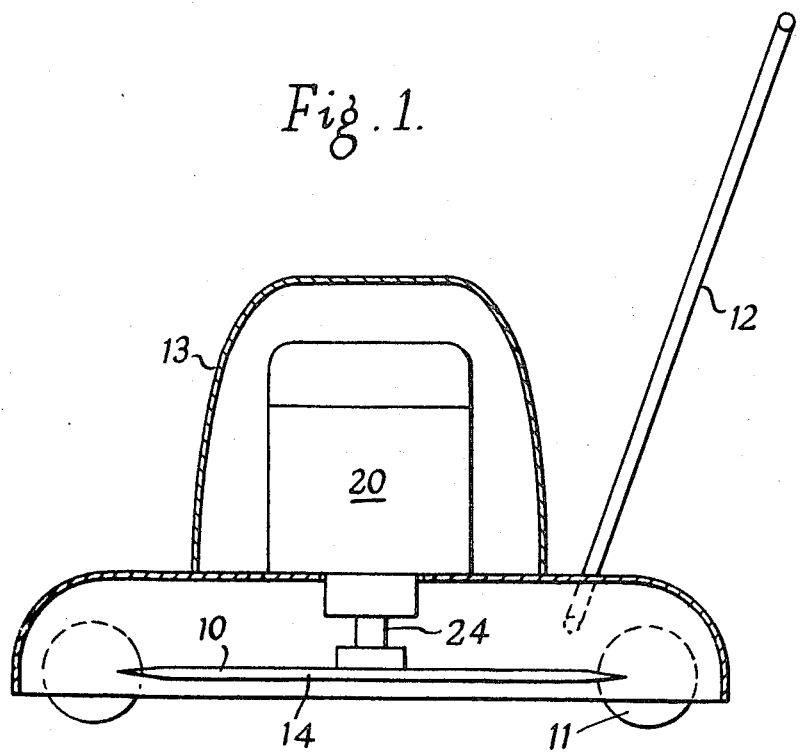
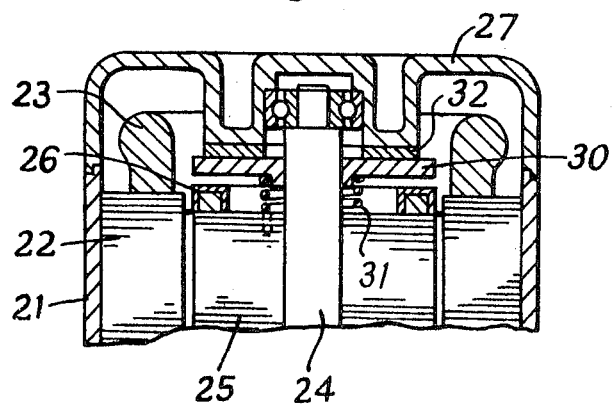
INVENTORS:
Hans Haverkamp
Gernot Neumann
BY *Spencer & Kaye*
Attorneys

United States Patent Office 3,570,226
Patented Mar. 16, 1971

3,570,226
ELECTRICALLY DRIVEN LAWNMOWER
Hans Haverkamp and Gernot Neumann, Lipperreihe, near Bielefeld, Germany, assignors to Hanning Elektro-Werke Robert Hanning, Bielefeld, Germany
Filed Aug. 5, 1968, Ser. No. 750,447
Claims priority, application Germany, Aug. 5, 1967, P 15 82 243.2
Int. Cl. A01d 35/26
U.S. Cl. 56—25.4      2 Claims

ABSTRACT OF THE DISCLOSURE

A lawnmower is driven by an electric motor. The motor is provided with a brake which is operated magnetically by the rotor of the motor, and which is applied automatically when the motor is de-energized.

---

This invention relates to an electrically driven lawnmower, the cutters of which, rotate horizontally in a mobile protective housing, are secured on the downwardly directed shaft stub of an electric motor mounted on the protective housing and preferably surrounded by a separate covering hood.

In contrast to lawnmowers driven by petrol engines, such appliances develop a more favourable cutting performance, by reason of the high rotation speeds achievable with electric motors, but on the other hand, generally have the disadvantage that after the electric motor is switched off the running-down time of the cutters is relatively long on account of the lack of appreciable friction moments. To this extent there is a considerable danger of accident if after the termination of the work the operator should prematurely tip over the lawnmower in order to clean the cutters. This danger is here the greater in that hardly any running noises are still audible after the electric motor is switched off, and also on account of the construction style enclosed on all sides it cannot readily be ascertained otherwise from the exterior whether the cutters have already come to a halt.

In order to avoid the accidents possible due to the above-mentioned drawbacks, it is already known to provide lawnmowers of the kind in question with brake devices which comprise a brake ring fitted on the shaft of the electric motor, against which a mechanically actuated brake lever is applied as soon as the electric motor is switched off. In constructions which have come into practical use the disengagement of such brakes is effective with the aid of a Bowden cable which is coupled with the switch for the current supply. Electrically driven lawnmowers have also become known the drive shaft of which is provided with an externally visible inspection disc, so that the operator can be informed optically in each case when the appliance finally comes to a halt. However, even this precaution would not appear to offer the requisite safety, since again there is no absolute guarantee that the cutters are not touched too early.

It is the problem of the invention to make an electrically driven lawnmower available which differs from the constructions hitherto in an advantageous manner as regards its operating safety. Therefore it is proposed as an essential measure that the electric motor should be equipped with an automatic brake device actuated magnetically by its rotor. Furthermore, according to other features of the invention which produce an especially favourable constructional form, an annular magnetic body can be placed upon the short-circuit rings of the rotor, opposite to which body there is an axially displaceable armature plate subject to the influence of a helical spring, which plate is attracted by the magnetic body when the electric motor is in the switched-on condition and is pressed, after the electric motor is switched off, against a brake lining fitted on the motor bearing plate, in order to generate a brake action.

The advantage obtained by the invention in comparison with the prior art are to be seen, apart from the safety achieved by the minimised running-down time of the cutters, above all in the arrangement of the brake device within the housing pertaining to the electric motor, because in this way the brake devices are most extensively protected against soiling and moisture influences. Moreover, the construction of the novel lawnmower is simplified considerably insofar as the brake device forms one single component together with the electric motor, requiring no separate assembly. Finally, it is also to be emphasized that the brake device according to the invention comes into action even in the case of unintentional current failure, such as cable breakage etc., and thus halts the cutters of the lawnmower without delay.

The invention will be explained in greater detail hereinafter by reference to an example of embodiment of the object thereof which is illustrated in the accompanying drawing, wherein:

FIG. 1 shows the diagrammatically illustrated lateral elevation of a lawnmower, and FIG. 2 shows the partial cross-section of the electric motor deriving from the lawnmower according to FIG. 1.

In the drawing, the lawnmower as illustrated in FIG. 1 possesses a protective housing 10 which is mobile on wheels 11 and is moved with a guide-rod 12 over the lawn surface to be mown. Horizontally mounted cutters 14, which are driven by an electric motor 20 mounted on the protective housing 10 and surrounded by a separate covering hood 13, rotates within the protective housing 10. For this purpose the cutters 14 are secured on the downwardly directed shaft stub of the motor shaft 24.

The electric motor 20 reproduced in an enlarged fashion in FIG. 2 accommodates the stator 22 and the winding 23 thereof in its housing 21. The vertical motor shaft 24 carries the rotor 25, on the upper short-circuit rings of which a magnetic body 26 is placed. Opposite to this magnetic body 26 there is an armature plate 30 subject to the influence of the helical spring 31, which plate can move axially between the magnetic body 26 and a brake lining 32 fitted on the motor bearing plate 27. Thus when the electric motor 20 is switched on the plate is attracted and thus disengaged from the brake lining 32, by the magnetic body 26 which is energised through the rotor 25. The helical spring 31, which is let by means of a peg into the rotor 25 and drawn under tension onto a protuberance of the armature plate 30, is at the same time compressed. After the electric motor 20 is switched off the magnetic body 26 loses its effect and the armature plate 30 is pressed without delay against the brake lining 32 by the helical spring 31. The consequence of this is an immediate braking not only of the electric motor 20 but also of the cutters 14 of the lawnmower as described, in conformity with the main aim of the invention.

We claim:

1. An electrically driven lawnmower comprising an electric motor having a stator and a rotor, a downwardly directed shaft on which said rotor rotates, cutter blades mounted on said shaft for rotation, with said rotor and in a horizontal plane, a stationary brake member, a brake armature mounted for rotation with said rotor, means for biassing said brake armature into engagement with said stationary brake member and magnetic means for disengaging and holding away said brake armature from said stationary brake member when said electric motor is energized.

2. An electrically driven lawn mower comprising an electric motor having a stator and a rotor, short circuit rings on said rotor, a downwardly directed shaft on which said rotor rotates, cutter blades mounted on said shaft for rotation with said rotor and in a horizontal plane, an annular magnetic body positioned on said short circuit rings, an axially movable brake armature mounted for rotation with said rotor and positioned adjacent said annular magnetic body so as to be attracted towards said annular magnetic body on energization of said motor, a stationary brake lining and a spring for urging said brake armature against said stationary brake lining when said motor is de-energized.

References Cited

UNITED STATES PATENTS 3,230,695    1/1966    West _____ 56—25.4

ROBERT PESHOCK, Primary Examiner